United States Patent
Chen et al.

(10) Patent No.: US 12,259,961 B2
(45) Date of Patent: Mar. 25, 2025

(54) EFFICIENT INTERACTION PROCESSING USING SECRET

(71) Applicant: Visa International Service Association, San Francisco, CA (US)

(72) Inventors: Yuexi Chen, Foster City, CA (US); Marc Kekicheff, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 17/798,856

(22) PCT Filed: Aug. 31, 2021

(86) PCT No.: PCT/US2021/048470
§ 371 (c)(1),
(2) Date: Aug. 10, 2022

(87) PCT Pub. No.: WO2023/033808
PCT Pub. Date: Mar. 9, 2023

(65) Prior Publication Data
US 2024/0193250 A1 Jun. 13, 2024

(51) Int. Cl.
*G06F 21/44* (2013.01)
*G06F 21/33* (2013.01)
*G06F 21/60* (2013.01)

(52) U.S. Cl.
CPC .............. *G06F 21/44* (2013.01); *G06F 21/33* (2013.01); *G06F 21/602* (2013.01); *G06F 21/606* (2013.01)

(58) Field of Classification Search
CPC .......... G06F 21/30; G06F 21/31; G06F 21/33; G06F 21/44; G06F 21/60; G06F 21/602; G06F 21/606
See application file for complete search history.

(56) References Cited

U.S. PATENT DOCUMENTS 10,657,754 B1 * 5/2020 Osborn ............ G06K 19/07749
11,551,200 B1 * 1/2023 Cook .................. G06Q 20/3226
(Continued)

FOREIGN PATENT DOCUMENTS

| CN | 108830587 A | 11/2018 |
|---|---|---|
| CN | 111476574 A | 7/2020 |

OTHER PUBLICATIONS

PCT/US2021/048470, "International Search Report and Written Opinion", May 26, 2022, 12 pages.
(Continued)

*Primary Examiner* — D'Arcy Winston Straub
(74) *Attorney, Agent, or Firm* — Kilpatrick Townsend & Stockton LLP (57) ABSTRACT

A method includes an access device determining an interaction value associated with an interaction. The access device prompts a user operating a user device for a secret. The access device receives the secret. The access device receives an initial communication then a user device certificate comprising a public key from the user device. The access device then verifies the certificate. The access device concatenates at least the secret and an unpredictable number to form a concatenated value. The access device encrypts the concatenated value with the public key, then transmits the encrypted concatenated value. The user device decrypts the encrypted concatenated value with a private key, verifies the unpredictable number, verifies the secret, determines whether or not the interaction is approved, produces an interaction authorization result, and then provides the interaction authorization result to the contactless access device. The access device receives the interaction authorization result.

20 Claims, 5 Drawing Sheets

(56) References Cited

U.S. PATENT DOCUMENTS

| | | | |
|---|---|---|---|
| 2007/0278291 A1* | 12/2007 | Rans | G06F 21/31 |
| | | | 235/492 |
| 2011/0251958 A1* | 10/2011 | Aubin | G06Q 20/40 |
| | | | 705/44 |
| 2014/0263625 A1 | 9/2014 | Smets et al. | |
| 2015/0039494 A1 | 2/2015 | Sinton et al. | |
| 2016/0261411 A1 | 9/2016 | Yau et al. | |
| 2019/0089531 A1 | 3/2019 | Le Saint et al. | |
| 2019/0258475 A1 | 8/2019 | Pirzadeh et al. | |
| 2019/0334888 A1 | 10/2019 | Kekicheff et al. | |
| 2019/0362341 A1 | 11/2019 | Chen et al. | |
| 2019/0394054 A1 | 12/2019 | Pirzadeh et al. | |
| 2020/0137573 A1 | 4/2020 | Chen et al. | |
| 2020/0286088 A1 | 9/2020 | Glendenning | |
| 2020/0389490 A1 | 12/2020 | Rezaei et al. | |
| 2021/0004806 A1 | 1/2021 | Noe et al. | |
| 2021/0006396 A1 | 1/2021 | Chen et al. | |
| 2021/0012306 A1 | 1/2021 | Chen et al. | |
| 2021/0034769 A1 | 2/2021 | Chen et al. | |
| 2021/0042753 A1 | 2/2021 | Wong et al. | |
| 2021/0192881 A1 | 6/2021 | Osborn et al. | |
| 2022/0101286 A1* | 3/2022 | Aleksandrov | G06Q 20/341 |

OTHER PUBLICATIONS

CA3,167,592 , "Office Action", Nov. 24, 2023, 3 pages.
EP21956228.7 , "Extended European Search Report", Sep. 11, 2024, 10 pages.
11202251924R; "Written Opinion", Jan. 8, 2025, 8 pages.
3,167,592, "CA Office Action", Jan. 23, 2025, 3 pages.

* cited by examiner

EFFICIENT INTERACTION PROCESSING USING SECRET

CROSS-REFERENCES TO RELATED APPLICATIONS

This application is a U.S. National Stage of PCT Application No. PCT/US2021/048470, filed Aug. 31, 2021, which is herein incorporated by reference in its entirety for all purposes

BACKGROUND

During some interactions between user devices and access devices, offline PIN authentication is required to perform contact (e.g., contact between the user device and the access device) based interactions. Further, contact based interactions are required to perform high value interactions. Thus, if a contactless interaction is attempted, but a value of the interaction is too high, then the contactless interaction cannot be performed, and must be performed as a contact based interaction instead.

To solve this problem double tap interactions were created. In a first tap, the user device and access device communicate regarding the interaction data. Then the user is prompted to input a secret into the access device. Then the user needs to tap the user device again against the access device to allow the access device to verify the secret.

The current double tap interaction method is slow, inefficient, and cumbersome. Embodiments of the disclosure address this problem and other problems individually and collectively.

SUMMARY

Embodiments are related to methods and systems for efficient interaction processing using a secret.

One embodiment is related to a method comprising: determining, by a contactless access device, an interaction value associated with an interaction; responsive to determining the interaction value, prompting, by the contactless access device, a user operating a user device for a secret; receiving, by the contactless access device, the secret from the user; after receiving the secret from the user, receiving, by the contactless access device from the user device, an initial communication from the user device over a wireless communication medium; receiving, by the contactless access device from the user device, a user device certificate comprising a public key; verifying, by the contactless access device, the user device certificate; concatenating at least the secret and an unpredictable number to form a concatenated value; encrypting, by the contactless access device, the concatenated value with the public key; transmitting, by the contactless access device, the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and receiving, by the contactless access device from the user device, the user device interaction authorization result.

Another embodiment is related to a contactless access device comprising: a processor; and a computer-readable medium coupled to the processor, the computer-readable medium comprising code executable by the processor for implementing a method comprising: determining an interaction value associated with an interaction; responsive to determining the interaction value, prompting a user operating a user device for a secret; receiving the secret from the user; after receiving the secret from the user, receiving, from the user device, an initial communication from the user device over a wireless communication medium; receiving, from the user device, a user device certificate comprising a public key; verifying the user device certificate; concatenating at least the secret and an unpredictable number to form a concatenated value; encrypting the concatenated value with the public key; transmitting the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and receiving, from the user device, the user device interaction authorization result.

Another embodiment is related to a method comprising: upon entering communication range with a contactless access device during an interaction, providing, by a user device, an initial communication from the user device over a wireless communication medium; receiving, by the user device, a read record command from the contactless access device, wherein the read record command requests at least one or more certificates from the user device; obtaining, by the user device, at least the one or more certificates from memory; generating, by the user device, a read record response message comprising at least the one or more certificates; providing, by the user device, the read record response message to the contactless access device in response to the read record command, wherein the one or certificates includes a user device certificate comprising a public key, wherein the contactless access device verifies the user device certificate, concatenates at least a secret provided by a user of the user device to the contactless access device and an unpredictable number to form a concatenated value, encrypts the concatenated value with the public key, and transmits the encrypted concatenated value over the wireless communication medium to the user device; receiving, by the user device, the encrypted concatenated value from the contactless access device; decrypting, by the user device, the encrypted concatenated value using a private key corresponding to the public key; verifying, by the user device, the secret included in the concatenated value by comparing the secret to another secret stored in the user device; producing, by the user device, a user device interaction authorization result based on whether or not the interaction is approved based at least upon the verification of the secret; and providing, by the user device, the user device interaction authorization result to the contactless access device.

Further details regarding embodiments of the disclosure can be found in the Detailed Description and the Figures.

DETAILED DESCRIPTION

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data or network data. Transaction data can comprise a plurality of data elements with data values.

An "interaction value" can include a numerical amount associated with an interaction with interaction data. An interaction value can include an amount of resources, a value of the resources, a size of transferred data, etc. In some embodiments, if the interaction is a transaction, then an interaction value for can be a transaction amount.

A "secret" can include something that is kept or meant to be kept unknown or unseen by others. A secret can include a value known to a user and securely stored by a user device operated by the user. A secret can include a PIN, a passcode, a biometric, a one-time password, an access code, or a username-password pair. A user can input a secret into an access device to gain access to a resource. The access device can communicate with the user device (as described in further detail herein) to verify the secret.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

A "certificate" or "digital certificate" can include an electronic document used to prove ownership. A certificate can be used to prove ownership of a public key. A digital certificate can cryptographically link ownership of a public key to an entity that owns the public key. A digital certificate can include the public key being certified, identifying information about the entity that owns the public key, metadata related to the certificate, and a digital signature.

An "unpredictable number" can include a value that is not able, or is not easily able, to be predicted. An unpredictable number can be generated using a random or pseudorandom number generation process. An unpredictable number can be of any suitable size. For example, an unpredictable number can have a length of 2 bytes, 4 bytes, 8 bytes, etc.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "wireless communication medium" can include a communication channel operating by transmitted electromagnetic waves over the air. A wireless communication medium can allow two or more devices to communicate when not in contact. In some embodiments, a device that communicates over a wireless communication medium can be a contactless device. In some embodiments, a wireless communication medium can use near-field communication (NFC).

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Various embodiments are directed to a method for performing an offline contactless interaction using a secret while using only one tap of the card against a contactless access device. In embodiments of the invention, the secret is first received by the contactless access device (e.g., via user input). The contactless access device then takes a number of steps to verify a user device being used by the user and then encrypts the secret and sends the encrypted secret to the user device for verification. Upon successful verification of the secret, the contactless access device can proceed with processing the interaction.

Figure 1:
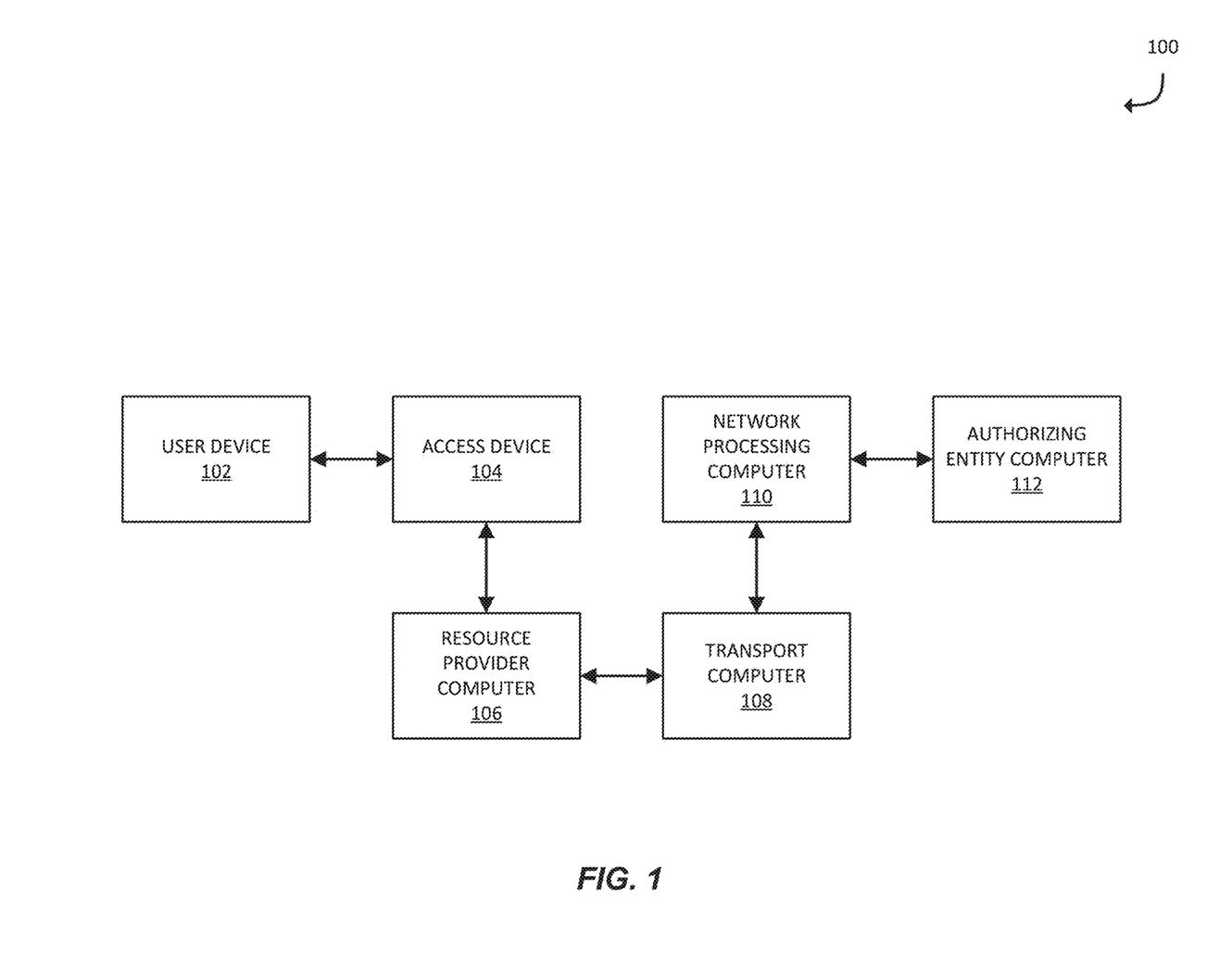
FIG. 1 shows a block diagram of an interaction processing system according to embodiments.

FIG. 1 shows a system 100 according to embodiments of the disclosure. The system 100 comprises a user device 102, an access device 104, a resource provider computer 106, a transport computer 108, a network processing computer 110, and an authorizing entity computer 112. The user device 102 can be in operative communication with the access device 104. The access device 104 can be in operative communication with the resource provider computer 106, which may be in operative communication with the transport computer 108. The transport computer 108 can be in operative communication with the network processing computer 110. The network processing computer 110 can be in operative communication with the authorizing entity computer 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include any suitable device operable by a user. The user device 102 can be a smart phone, a smart watch, a tablet, a laptop computer, a desktop computer, etc. The user device 102 may be able to receive communications from and send communications to the access device 104.

The access device 104 can include a device that provides access to a remote system. The access device 104 may be able to communicate with the user device 102 and the resource provider computer 106. The access device 104 may generally be located in any suitable location, such as at the location of a merchant associated with the resource provider computer 106. The access device can be a POS terminal, a cellular phone, a PDA, a personal computer, a tablet, a hand-held specialized reader, a set-top box, an electronic cash register, a vending machine, an automated teller machine, a virtual cash register, a kiosk, a security system, an access system, etc.

The resource provider computer 106 can include a computer associated with a resource provider. The resource provider computer 106 can receive information (e.g., interaction data) from the access device 104 regarding an interaction during the interaction with the user device 102. The resource provider computer 106 can provide the interaction data to the transport computer 108. In some embodiments, the resource provider computer 106 can be integrated into a single device with the access device 104.

The resource provider computer 106 or the access device 104 can generate an authorization request message, which can be provided to the transport computer 108 during the interaction for authorization of the interaction.

The transport computer 108 may be any computer for receiving and forwarding authorization messages according to embodiments of the invention. In one embodiment, the transport computer 108 may be a computer of an acquiring entity that enables a resource provider to conduct specific types of interactions. The transport computer 108 may receive the authorization request message from the resource provider computer 106 and may forward the message to the network processing computer 110.

The network processing computer 110 may be any computer or server computer for processing interactions according to embodiments of the invention. For example, the network processing computer 110 may be a computer of an interaction processing network, such as VisaNet, and may be configured to receive, read, analyze, store, and retrieve interaction data as well as determine appropriate actions based on predetermined logic. The network processing computer 110 may analyze the authorization request message to determine whether the message includes a token. If the network processing computer 110 determines that the authorization request message includes a token, the network processing computer 110 provides the token to a token vault and retrieves an account identifier (e.g., PAN) corresponding to (e.g., represented by) the token. The network processing computer 110 may then replace the token with the account identifier in the authorization request message.

The network processing computer 110 may determine, based on the data in the authorization request message, an authorizing entity computer 112. For example, the network processing computer 110 may analyze the account identifier and may determine that the first six digits of the account identifier comprises an issuer identification number (IIN) specifying an authorizing system associated with the account represented by the account identifier. In one embodiment, the authorizing entity computer 112 may be a computer of an issuing entity that issues credentials and/or an account holder card to the user such as a bank, government agency, security network, etc. Upon determination of the authorizing entity computer, the network processing computer 110 may determine an address of the authorizing entity computer 112, so that the authorization request message can be routed to the authorizing entity computer 112 for authorization of the interaction.

The authorizing entity computer 112 may be any computer or server computer for processing interactions and determining whether or not to authorize an interaction according to embodiments of the invention. The authorizing entity computer 112 can be operated and/or maintained by an authorizing entity. The authorizing entity computer 112 can determine whether or not to authorize an interaction when receiving an authorization request message. For example, the authorizing entity computer 112 can determine an authorization result based on the data contained in the authorization request message. For example, the data may comprise an account identifier or PAN that is associated with an availability of funds or credit that may be compared to an interaction value (e.g., a transaction amount). The authorizing entity computer 112 may evaluate the received data and determine an authorization result of "approve" or "decline."

Before further describing specific systems and methods for performing efficient interaction processing using a secret within the system 100, a brief description of how interaction processing may proceed in interaction infrastructure, according to some embodiments, will be provided for context.

The user may conduct an interaction (e.g., a transaction) at a resource provider location using the user device 102. The interaction may be a payment transaction (e.g., for the purchase of a good or service), an access transaction (e.g., for access to a transit system), or any other suitable transaction. The user device 102 can interact with the access device 104 at a resource provider associated with resource provider computer 106. For example, the user may tap the user device 102 against an NFC reader of the access device 104, or otherwise bring the user device 102 into a near field communication range with the access device 104, to perform a contactless interaction. Alternately, in other cases, the user may indicate an interaction value to the resource provider electronically, such as in an online interaction. In some cases, the user device 102 may transmit an account identifier, such as a token, to the access device 104.

In order to authorize the interaction, an authorization request message may be generated by the access device 104 or the resource provider computer 106 and then forwarded to the transport (e.g., acquirer) computer 108. After receiving the authorization request message, the authorization request message is then sent to the network processing computer 110. The network processing computer 110 then forwards the authorization request message to the corresponding authorizing entity computer 112 associated with an authorizing entity associated with a user account of the user of the user device 102.

After the authorizing entity computer 112 receives the authorization request message, the authorizing entity computer 112 sends an authorization response message back to the network processing computer 110 to indicate whether the current interaction is authorized (or not authorized). The network processing computer 110 then forwards the authorization response message back to the transport computer 108. In some embodiments, network processing computer 110 may decline the interaction even if the authorizing entity computer 112 has authorized the interaction, for example depending on a value of a fraud risk score. The transport computer 108 then sends the response message back to the resource provider computer 106.

After the resource provider computer 106 receives the authorization response message, the resource provider computer 106 may then provide the authorization response message to the user. For example, the response message may be displayed by the access device 104, or may be printed out on a physical receipt. Alternately, the resource provider may provide a web page or other indication of the authorization response message as a virtual receipt to the user device 102. The receipts may include interaction data for the interaction.

At the end of the day, a normal clearing and settlement process can be conducted by the network processing computer 110. A clearing process is a process of exchanging financial details between an acquirer and an authorizing entity to facilitate posting to a user's payment account and reconciliation of the user's settlement position.

Figure 2:
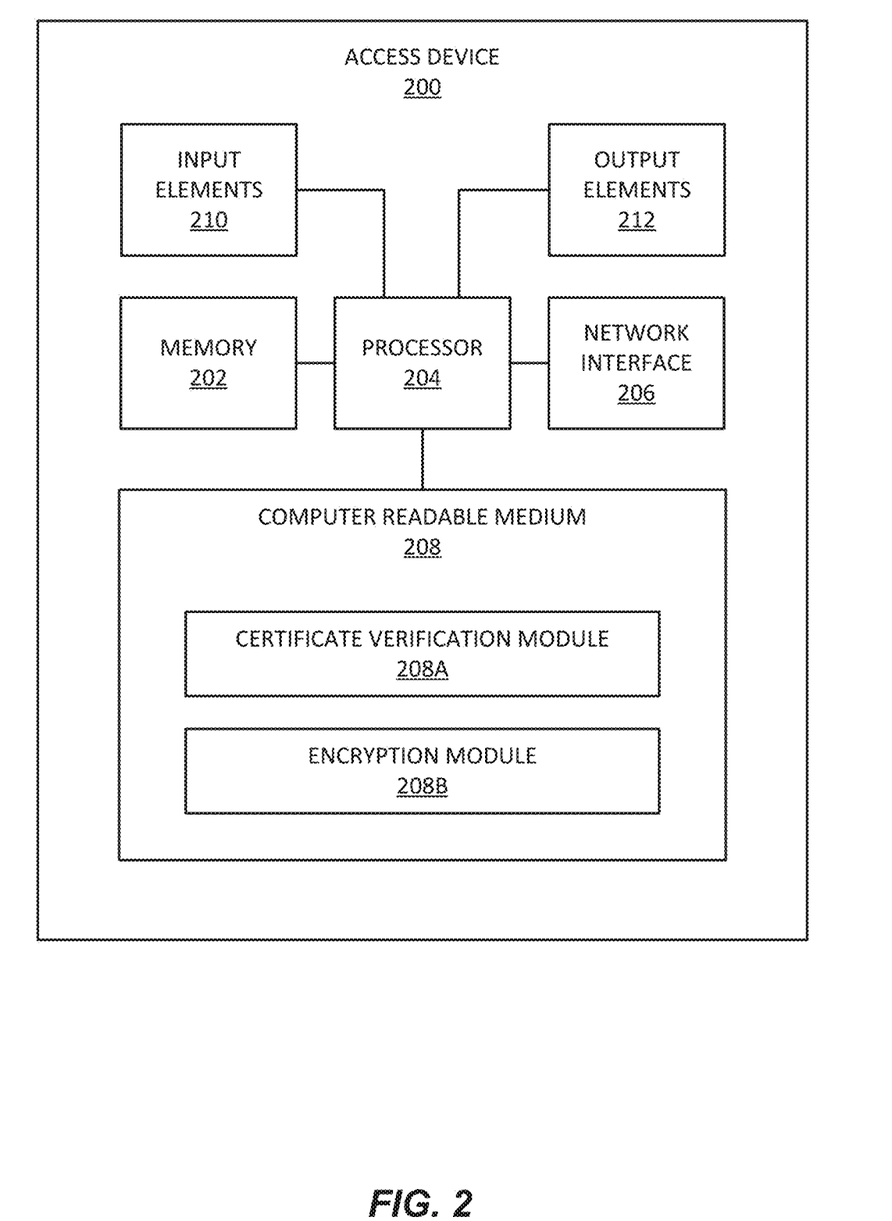
FIG. 2 shows a block diagram of components of an access device according to embodiments.

FIG. 2 shows a block diagram of an access device 200 according to embodiments. The exemplary access device 200 may comprise a processor 204. The processor 204 may be coupled to a memory 202, a network interface 206, input elements 210, output elements 212, and a computer readable medium 208. The computer readable medium 208 can comprise a certificate verification module 208A, an encryption module 208B, and another suitable modules.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store interaction values, interaction data, certificates, etc.

The one or more input elements 210 may include any suitable device(s) capable of inputting data into the access device 200. Examples of input elements 210 include buttons, touchscreens, touch pads, microphones, etc. A user can utilize the one or more input elements 210 to provide data to the access device 200. For example, a user can input a secret into the access device 200 via the one or more input elements 210 (such as a keypad).

The one or more output elements 212 may comprise any suitable device(s) that may output data. Examples of output elements 212 may include display screens, speakers, and data transmission devices. For example, the output elements 212 can include a display screen capable of displaying a response value to a user of the access device 200.

The computer readable medium 208 may comprise code, executable by the processor 204, for performing a method comprising: determining, by a contactless access device, an interaction value associated with an interaction; responsive to determining the interaction value, prompting, by the contactless access device, a user operating a user device for a secret; receiving, by the contactless access device, the secret from the user; after receiving the secret from the user, receiving, by the contactless access device from the user device, an initial communication from the user device over a wireless communication medium; receiving, by the contactless access device from the user device, a user device certificate comprising a public key; verifying, by the contactless access device, the user device certificate; concatenating at least the secret and an unpredictable number to form a concatenated value; encrypting, by the contactless access device, the concatenated value with the public key; transmitting, by the contactless access device, the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and receiving, by the contactless access device from the user device, the user device interaction authorization result.

The certificate verification module 208A may comprise code or software, executable by the processor 204, for verifying certificates. The certificate verification module 208A, in conjunction with the processor 204, can verify one or more certificates. The certificate verification module 208A, in conjunction with the processor 204, can verify certificates received from a user device during an interaction.

For example, the certificate verification module 208A, in conjunction with the processor 204, can verify an authorizing entity certificate comprising an authorizing entity certificate public key, where the authorizing entity certificate is signed by a certificate authority using a certificate authority private key. The certificate verification module 208A, in conjunction with the processor 204, can verify the signature on the authorizing entity certificate using a stored, or otherwise available, certificate authority public key. The certificate verification module 208A, in conjunction with the processor 204, can verify a signature with a public key in any suitable manner known to one skilled in the art.

Furthermore, the certificate verification module 208A, in conjunction with the processor 204, can verify a user device certificate comprising a public key (e.g., a user device public key, and in some embodiments, a secret encipherment public key), where the user device certificate is signed by an authorizing entity using an authorizing entity private key that corresponds to the authorizing entity public key. The certificate verification module 208A, in conjunction with the processor 204, can verify the signature on the user device certificate using the authorizing entity public key obtained from the authorizing entity certificate.

The encryption module 208B can include may comprise code or software, executable by the processor 204, for encrypting data. The encryption module 208B, in conjunction with the processor 204, can encrypt a secret (e.g., that was obtained from a user via the input elements 210). For example, the encryption module 208B, in conjunction with the processor 204 can encrypt the secret using a public key obtained from the user device certificate. In some embodiments, the encryption module 208B, in conjunction with the processor 204, can encrypt the secret using a user device public key obtained from the user device certificate. In other embodiments, the encryption module 208B, in conjunction with the processor 204, can encrypt the secret using a secret encipherment public key obtained from the user device certificate. The encryption module 208B, in conjunction with the processor 204, may attempt to first utilize a secret encipherment public key from the user device certificate, then, if no secret encipherment public key is included in the user device certificate, the encryption module 208B, in conjunction with the processor 204, can utilize the user device public key included in the user device certificate.

The network interface 206 may include an interface that can allow the access device 200 to communicate with external computers. The network interface 206 may enable the access device 200 to communicate data to and from another device (e.g., a user device, a resource provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
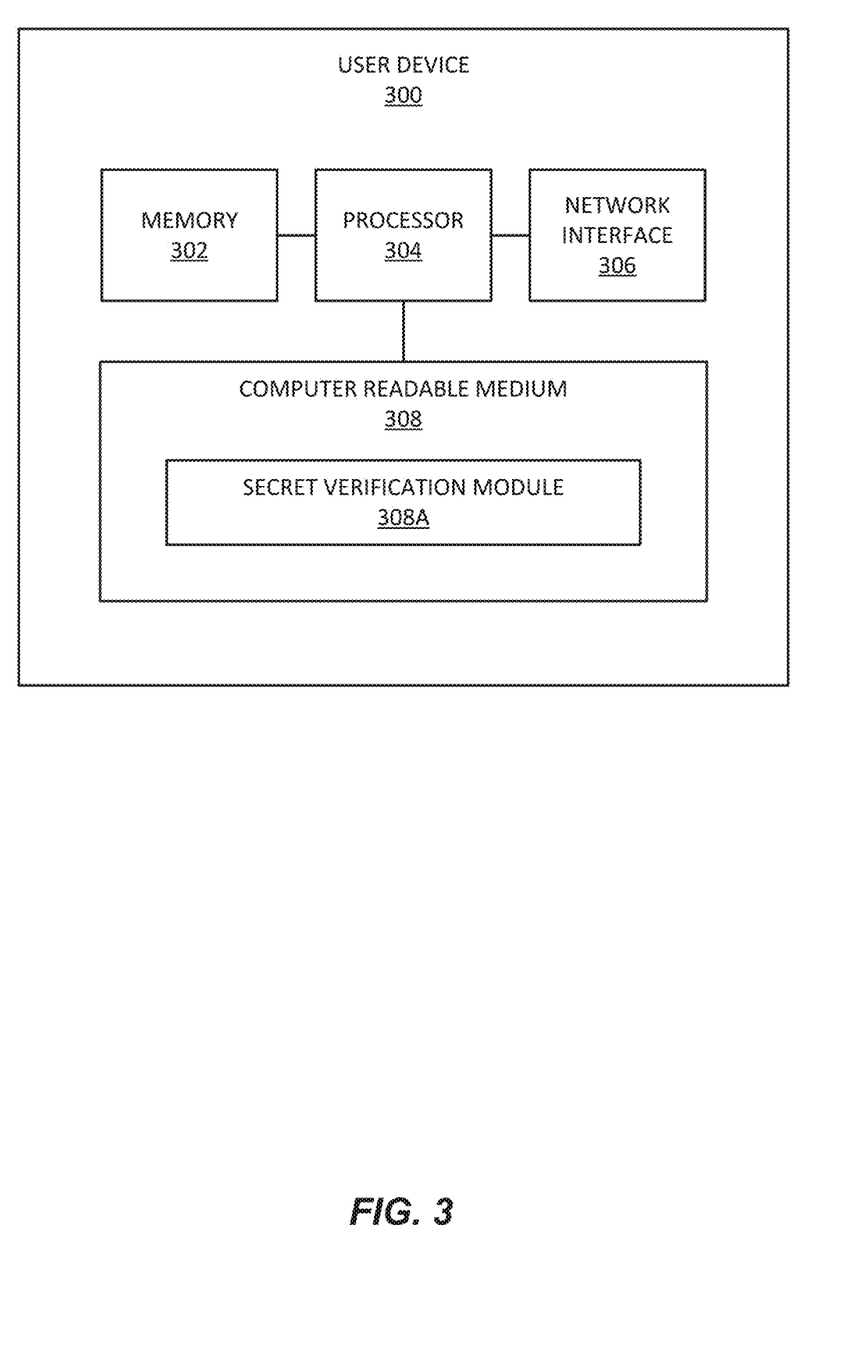
FIG. 3 shows a block diagram of components of a user device according to embodiments.

FIG. 3 shows a block diagram of a user device 300 according to embodiments. The exemplary user device 300 may comprise a processor 304. The processor 304 may be coupled to a memory 302, a network interface 306, input elements 310, output elements 312, and a computer readable medium 308. The computer readable medium 308 can comprise a secret verification module 308A and another suitable modules.

The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device. For example, the memory 302 can store a user device certificate, etc.

The computer readable medium 308 may comprise code, executable by the processor 304, for performing a method comprising: upon entering communication range with a contactless access device during an interaction, providing, by a user device, an initial communication from the user device over a wireless communication medium; receiving, by the user device, a read record command from the contactless access device, wherein the read record command requests at least one or more certificates from the user device; obtaining, by the user device, at least the one or more certificates from memory; generating, by the user device, a read record response message comprising at least the one or more certificates; providing, by the user device, the read record response message to the contactless access device in response to the read record command, wherein the one or certificates includes a user device certificate comprising a public key, wherein the contactless access device verifies the user device certificate, concatenates at least a secret provided by a user of the user device to the contactless access device and an unpredictable number to form a concatenated value, encrypts the concatenated value with the public key, and transmits the encrypted concatenated value over the wireless communication medium to the user device; receiving, by the user device, the encrypted concatenated value from the contactless access device; decrypting, by the user device, the encrypted concatenated value using a private key corresponding to the public key; verifying, by the user device, the secret included in the concatenated value by comparing the secret to another secret stored in the user device; producing, by the user device, a user device interaction authorization result based on whether or not the interaction is approved based at least upon the verification of the secret; and providing, by the user device, the user device interaction authorization result to the contactless access device.

The secret verification module 308A may comprise code or software, executable by the processor 304, for verifying a secret. The secret verification module 308A, in conjunction with the processor 304, can verify a secret received from an access device. The secret verification module 308A, in conjunction with the processor 304, can obtain the secret from a concatenated value that was obtained by the user device 300 by decrypting an encrypted concatenated value using a user device private key or a secret encipherment private key.

The secret verification module 308A, in conjunction with the processor 304, after obtaining the secret, can verify the secret included in the concatenated value by comparing the secret to another secret stored in the user device 300. For example, the secret verification module 308A, in conjunction with the processor 304, can obtain a secret stored in the user device 300 (e.g., in memory). The secret verification module 308A, in conjunction with the processor 304, can output can indication of whether or not the secret matches the stored secret to the user device 300. The user device 300 can then utilize the indication of whether or not the secret matches the stored secret to inform an access device (e.g., a contactless access device) of the indication (e.g., in the form of a user device interaction authorization result, as described in further detail herein).

The network interface 306 may include an interface that can allow the user device 300 to communicate with external computers. The network interface 306 may enable the user device 300 to communicate data to and from another device (e.g., a user device, a resource provider computer, etc.). Some examples of the network interface 306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 4A:
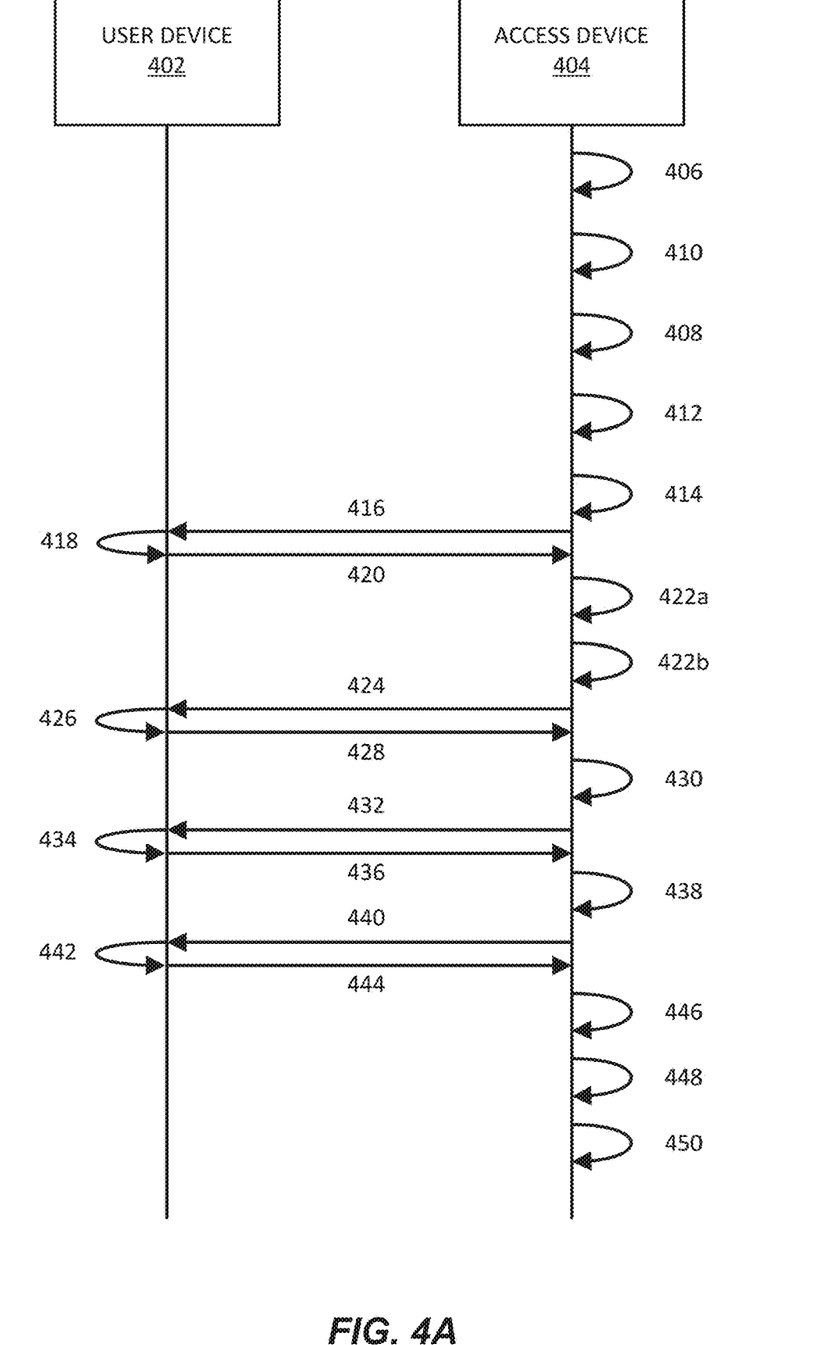
FIGS. 4A-4B show a flowchart of a contactless interaction with secret verification processing method according to embodiments.
Figure 4B:
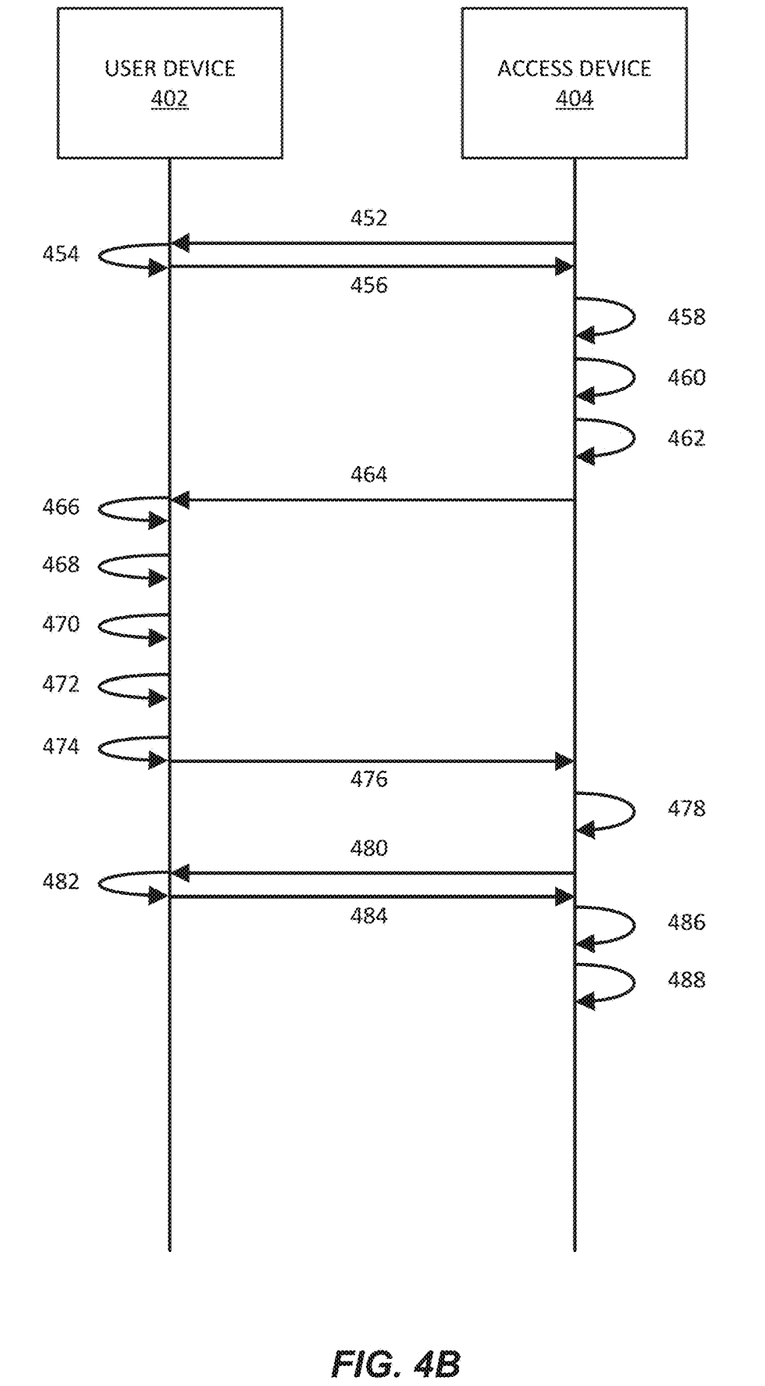

Embodiments can use the systems and apparatuses described herein to at least perform interaction processing using a secret. FIGS. 4-5 describe some examples of such methods. In some embodiments, a user device 402 and a user device 502 may include the user device 102 or the user device 300 of FIGS. 1 and 3, respectively. In some embodiments, an access device 404 and an access device 504 may include the access device 104 or the access device 200 of FIGS. 1 and 2, respectively.

FIG. 4 shows a flowchart of a contactless interaction with secret verification processing method according to embodiments. The method illustrated in FIG. 4 will be described in the context of a single tap contactless transaction flow which supports an offline secret such as a PIN. It is understood, however, that the invention can be applied to other circumstances (e.g., performing an access interaction to allow a user to access a secure location upon verification of a secret such as a password, etc.).

Prior to step 406, a user of the user device 402 and a resource provider of the access device 404 can initiate an interaction.

At step 406, the access device 404 can obtain an interaction value associated with the interaction. The interaction value can be an amount. For example, the interaction value can be a transaction amount such as $100. In some embodiments, the access device 404 can obtain the interaction value from a resource provider computer, as input from a resource provider, as input from an access device operator, etc. In other embodiments, the access device 404 can obtain the interaction value by determining the interaction value based on interaction data associated with the interaction. For example, the access device 404 can determine the interaction value based on one or more values associated with one or more items that are to be provided to the user of the user device 402 upon completion of the interaction.

In some embodiments, the access device 404 can determine whether or not to prompt the user of the user device 402 to input a secret. The secret can be a passcode, a one-time password, a personal identification number (PIN), etc.

For example, the access device 404 can compare the interaction value to a threshold value. The threshold value can be a predetermined value for which verification of a secret is required. For example, the threshold value can be a value of $25. If the interaction value is greater than the threshold value, then the access device 404 can determine that a secret is to be obtained from the user and verified with the user device 402. The access device 404 can then proceed to step 408. If the interaction value is less than the threshold value, then the access device 404 can determine that a secret is not needed to process the interaction. In such a case, the access device 404 can then perform a secret-less interaction with the user device 402.

At step 408, after obtaining the interaction value, the access device 404 can prompt the user operating the user device 402 for a secret. For example, the access device 404 can prompt the user to provide a secret as input to the access device 404 using a input output display screen or other suitable means.

In some embodiments, an option to skip the offline secret entry can be provided to the user in case the user device used by user doesn't support offline secret verification. In such a case, in some embodiments, the access device 404 can present an "Enter" or "Skip" options to the user. In other embodiments, the access device 404 can request the user to bring the user device into communication range (e.g., tap) to continue processing without verifying a secret, if the user device doesn't support secret verification.

At step 410, after prompting the user of the user device 402 to input the secret, the access device 404 can receive the secret from the user.

At step 412, after receiving the secret from the user, the access device 404 can prompt the user to bring the user device 402 into communication range with the access device 404. The communication range can be a near-field communication range (e.g., less than 2 feet, less than 1 foot, less than 5 inches, less than 4 cm inch, or any other suitable near-field communication range based on the type of communication channel utilized by the user device 402 and the access device 404).

Based on the prompt provided by the access device 404 at step 412, the user of the user device 402 can bring the user device 402 into communication range with the access device 404.

Once the user device 402 is in communication range with the access device 404, the access device 404 can establish a contactless connection (e.g., over the air) with the user device 402.

After receiving the secret from the user, the access device 404 can receive an initial communication from the user device 402 over a wireless communication medium, as described an initial communication round during steps 414-420.

At steps 414-420, the access device 404 and the user device 402 may perform application selection. For example, the access device 404 may determine which applications are supported by both the user device 402 and the access device 404.

At step 414, when the access device 404 detects the presence of the user device 402, the access device 404 generates an available applications request message (e.g., a "select command").

At step 416, the access device 404 can provide the available applications request message to the user device 402 to request information on which interaction applications (e.g., a list of AIDs) are be available at the user device 402. For example, the access device 404 can provide a proximity payment system environment (PPSE) select command message to the user device 402.

At step 418, after receiving the available applications request message, the user device 402 can obtain a list of available application identifiers (AIDs) stored by the user device 402.

At step 420, after obtaining the list of available application identifiers, the user device 402 can respond to the available applications request message by sending an available applications response message comprising the list of available application identifiers to access device 404. In some embodiments the user device 402 can provide file control information (FCI) to the access device 404.

At step 422*a*, the access device 404 can then select a suitable application from the list of applications received in the available applications response message. For example, the access device 404 can select an AID from the available AIDs.

At step 422*b*, the access device 404 can then generate an application selection message (which may be "select AID" command) comprising the selected AID.

At step 424, the access device 404 can provide the application selection message to the user device 402.

At step 426, after receiving the application selection message, the user device 402 may then generate an application selection response that indicates acknowledgement of the selected application. In some embodiments, the application selection response message can further include a request for interaction data that may be needed to execute the interaction using the selected application/AID. The request may include a list of interaction data identifiers, and the list can be in the form of a processing options data object list (PDOL).

At step 428, after generating the application selection response message, the user device 402 can provide the application selection response message to the access device 404.

At step 430, after receiving the application selection response message, the access device 404 initiates application processing. For example, the access device 404 may generate a request message requesting that the user device 402 indicate the data (e.g., a list of data elements) to be used for the selected application and the functions supported. In some embodiments, the access device 404 may generate a get processing options (GPO) command. The access device 404 may also include interaction information (e.g., PDOL related data) that was requested by the user device 402 into the GPO command.

At step 432, after generating the GPO command, the access device 404 provides the GPO command to the user device 402.

At step 434, after receiving the GPO command, the user device 402 can generate dynamic interaction processing information using at least some of the received interaction data, and generate a GPO response message comprising the dynamic interaction processing information. In some embodiments, the GPO response message can include a set of interaction processing information. The interaction processing information may include one or more application file locators (AFLs) that can be used as file addresses by access device 404 to read account data stored on user device 402.

At step 436, after generating the GPO command, the access device 404 provides the GPO response to the access device 404.

Through steps 438-444, the access device 404 may read application data from the user device 402. Specifically, at step 438, the access device 404 can generate read record request message(s) to read certificate data stored at the user device 402.

At step 440, after generating the read record request message, the access device 404 provides the read record request message(s) to the user device 402.

At step 442, after receiving the read record request message, the user device 402 can generate a read record response message comprising one or more certificates. The certificates can be data that is accessible at the AFL location. In some embodiments, the read record response message can include a user device certificate.

The user device certificate includes a user device public key and can be signed by an authorizing entity private key. In some embodiments, the read record response message can further include an authorizing entity certificate. The authorizing entity certificate includes an authorizing entity public key and can be signed by a certificate authority (CA).

At step 444, after generating the read record response message, the user device 402 provides the read record response message to the access device 404 in response to the read record request message.

As such, the access device 404 receives, from the user device, an authorizing entity certificate comprising an issuer public key and signed by a certificate authority private key and a user device certificate comprising a user device public key and signed by an issuer private key.

At step 446, after obtaining the certificates, the access device 404 can verify the authorizing entity certificate. The access device 404 can verify the authorizing entity certificate using a certificate authority public key stored on the access device 404 and/or is readily retrieved from a trusted online source. After verifying the authorizing entity certificate, the access device 404 can utilize the, now verified, authorizing entity public key included in the authorizing entity certificate.

In some embodiments, if the authorizing entity certificate is not valid, then the access device 404 can stop communication with the user device 402 and terminate the transaction.

At step 448, after verifying the authorizing entity certificate, the access device 404 can verify the user device certificate. The access device 404 can verify the user device certificate using the authorizing entity public key obtained from the valid authorizing entity certificate. After verifying the user device certificate, the access device 404 can utilize the, now verified, user device public key included in the user device certificate.

In some embodiments, if the user device certificate is not valid, then the access device 404 can break communication with the user device 402.

In some embodiments, the user device certificate can further include a encipherment public key. The encipherment public key can be utilized to encrypt the secret and may be a different public key than the user device public key. The encipherment public key can be utilized by the access device 404 to only encrypt the secret, in some embodiments. The encipherment public key can be associated with an encipherment private key stored on the user device 402, which is configured to decrypt the encrypted secret when encrypted with the encipherment public key.

At step 450, after verifying the certificates received from the user device 402, the access device can generate a get challenge command. The get challenge command can command the user device 402 to generate a unpredictable number (UN) and return the unpredictable number.

At step 452, after generating the challenge command, the access device 404 can provide the challenge command to the user device 402.

At step 454, after receiving the challenge command, the user device 402 can generate an unpredictable number. For example, the user device 402 can generate a random or pseudorandom number that cannot be, or is not easily, predicted. For example, the user device 402 can generate an unpredictable number in hexadecimal of f30d, 815aa652, etc.

At step 456, after generating the unpredictable number in response to the challenge command, the user device 402 can provide the unpredictable number to the access device 404.

At step 458, after receiving the unpredictable number, the access device 404 can combine the secret and the unpredictable number. For example, the access device 404 can concatenate at least the secret and the unpredictable number to form a concatenated value. In some embodiments, the access device 404 can also concatenate codes, values, timestamps, etc. with the secret and the unpredictable number. As an example, the access device 404 can concatenate the following: Concatenated_Value= ['7F'|Secret_Block|Unpredictable_Number].

In some embodiments, the access device 404 can include padding or random padding (e.g., a padding value) into the concatenated value to increase the length of the value (e.g., data size) to meet the length requirement of the user device public key.

At step 460, after obtaining the concatenated value, the access device 404 can encrypt the concatenated value with the user device public key (or the ICC PIN Encipherment public key if available). For example, the access device 404 can encrypt the following data block ['7F'|Secret_Block|Unpredictable_Number|Padding]. As such the access device 404 can perform the following operation:

EncryptedConcatenatedValue=UserDevicePublicKey
(['7F'|Secret_Block|UN|Padding])

At step 462, after encrypting the concatenated value, the access device 404 can generate a secret verification request message comprising the encrypted concatenated value.

At step 464, after generating the secret verification request message, the access device 402 can provide the secret verification request message to the user device 402. For example, the access device can transmit the encrypted concatenated value over the wireless communication medium.

At step 466, after receiving the secret verification request message, the user device 402 can decrypt the encrypted concatenated value with a user device private key corresponding to the user device public key.

At step 468, after decrypting the encrypted concatenated value to obtain the concatenated value comprising the unpredictable number and the secret, the user device 402 can verify the unpredictable number.

At step 470, after verifying the unpredictable number, the user device 402 can verify the secret. For example, the user device 402 can verify the secret by comparing the secret to another secret stored in the user device 402.

At step 472, after verifying the secret, the user device 402 determines whether or not the interaction is approved based at least upon the verification of the secret. For example, if the secret is verified, then the user device 402 can determine to approve the interaction. If the secret is not verified, then the user device 402 can determine to decline the interaction.

At step 474, after determining whether or not the interaction is approved, the user device 402 can generate, or otherwise produce, a user device interaction authorization result. The user device interaction authorization result can indicate whether or not the user device 402 approves the interaction. For example, user device 402 determined to approve the interaction at step 472, then the user device 402 interaction authorization result can indicate that the user device 402 approved the interaction.

At step 476, after generating the user device interaction authorization result, the user device can provide the user device interaction authorization result in a secret verification response message to the access device 404.

At step 478, after receiving the secret verification response message, the access device 404 generates a cryptogram request message At step 480, after generating the cryptogram request message, the access device 404 provides the cryptogram request message to the user device 402.

At step 482, after receiving the cryptogram request message, the user device 402 can generate a cryptogram. The user device 402 can generate the cryptogram in any suitable manner known to one of skill in the art.

At step 484, after generating the cryptogram, the user device 402 provides the cryptogram to the access device 404.

In some embodiments, the user device 402 can provide the user device interaction authorization result and the cryptogram to the access device 404 in a single message. For example, after verifying the secret, the user device 402 can generate the user device interaction authorization result that indicates that the interaction is approved. The user device 402 can then generate the cryptogram once the interaction is approved. The user device 402 can then provide both the cryptogram and the user device interaction authorization result to the access device 404.

At step 486, after receiving the cryptogram, the access device 404 can verify that the user device interaction authorization result indicates that the secret was verified and that the interaction is approved by the user device 402. If the access device 404 determines that the user device 402 declined the interaction, then the access device 404 can exit the interaction process and can display a notification to the user that the user device 402 declined the interaction or that the secret was incorrect. In some embodiments, the access device 404 can request the user to input another secret for verification with the user device 402.

At step 488, after receiving the cryptogram, the access device 404 can generate an authorization request message comprising the cryptogram and the interaction data with the interaction value.

After generating the authorization request message, the access device 404 can provide the authorization request message to a resource provider computer (not shown) to further process the interaction.

The resource provider computer provides the authorization request message to a transport computer, which then provides the authorization request message to a network processing computer. The network processing computer can provide the authorization request message to an authorizing entity computer for authorization of the interaction.

Upon receiving the authorization request message, the authorizing entity computer can determine whether or not to authorize the interaction. The authorizing entity computer can generate an indication of whether or not the interaction is authorized. The authorizing entity computer can generate an authorization response message comprising at least the indication of whether or not the interaction is authorized.

The authorizing entity computer can provide the authorization response message to the resource provider computer via the network processing computer and the transport computer.

Upon receiving the authorization response message the resource provider computer can provide the authorization response message or the indication of whether or not the interaction is authorized to the access device 404.

The access device 404 can display or otherwise notify the user and/or the user device 402 of the authorization response message and/or the indication of whether or not the interaction is authorized.

Embodiments of the disclosure have a number of advantages. For example, the user device and the access device only need to be brought into communication range once to communicate to verify a secret. Whereas, in previous methods, a user device and an access device would first need to be brought into communication range to communicate about interaction data, then would need to be brought into communication range again after the access device requests a PIN from the user to verify the PIN. Embodiments reduce the number of initial communication channel creation steps by 50%.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   determining, by a contactless access device, an interaction value associated with an interaction;
   responsive to determining the interaction value, prompting, by the contactless access device, a user operating a user device for a secret;
   receiving, by the contactless access device, the secret from the user;
   after receiving the secret from the user, receiving, by the contactless access device from the user device, an initial communication from the user device over a wireless communication medium;
   receiving, by the contactless access device from the user device, a user device certificate comprising a public key;
   verifying, by the contactless access device, the user device certificate;
   concatenating, by the contactless access device, at least the secret and an unpredictable number to form a concatenated value;
   encrypting, by the contactless access device, the concatenated value with the public key;
   transmitting, by the contactless access device, the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and
   receiving, by the contactless access device from the user device, the user device interaction authorization result,
   wherein the public key is a secret encipherment public key, and wherein the user device certificate includes the secret encipherment public key and a user device public key.

2. The method of claim 1, wherein the wireless communication medium uses NFC.

3. The method of claim 1, wherein the secret is a PIN, a passcode, a biometric, a one-time password, an access code, or a username-password pair.

4. The method of claim 1, wherein after determining the interaction value, the method further comprises:

determining, by the contactless access device, whether or not to prompt the user operating the user device for the secret based on the interaction value and a predetermined threshold.

5. The method of claim 1, wherein after receiving the secret, the method further comprises:
prompting, by the contactless access device, the user to bring the user device into communication range with the contactless access device;
generating, by the contactless access device, a read record command message that requests at least one or more certificates from the user device; and
when the user device is in the communication range with the contactless access device, providing, by the contactless access device, the read record command message to the user device, wherein the user device obtains at least the one or more certificates, generates a read record response message comprising at least the one or more certificates, and provides the read record response message to the contactless access device, wherein the one or certificates includes the user device certificate.

6. The method of claim 1, wherein the user device is a card.

7. The method of claim 1, wherein the method further comprises:
receiving, by the contactless access device, an authorizing entity certificate comprising an authorizing entity public key from the user device.

8. The method of claim 7, wherein the authorizing entity certificate is signed by a certificate authority private key, and wherein prior to verifying the user device certificate the method further comprises:
verifying, by the contactless access device, the authorizing entity certificate using a certificate authority public key available to the contactless access device and corresponds to the certificate authority private key; and
if the authorizing entity certificate is valid, obtaining, by the contactless access device, the authorizing entity public key from the authorizing entity certificate.

9. The method of claim 8, wherein the user device certificate is signed by an authorizing entity private key corresponding to the authorizing entity public key, and wherein verifying the user device certificate further comprises:
verifying, by the contactless access device, the user device certificate using the authorizing entity public key; and
if the user device certificate is valid, obtaining, by the contactless access device, the user device public key from the user device certificate.

10. A contactless access device comprising:
a processor; and
a computer-readable medium coupled to the processor, the computer-readable medium comprising code executable by the processor for implementing operations comprising:
determining an interaction value associated with an interaction;
responsive to determining the interaction value, prompting a user operating a user device for a secret;
receiving the secret from the user;
after receiving the secret from the user, receiving, from the user device, an initial communication from the user device over a wireless communication medium;
receiving, from the user device, a user device certificate comprising a public key;
verifying the user device certificate;
concatenating at least the secret and an unpredictable number to form a concatenated value;
encrypting the concatenated value with the public key;
transmitting the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and
receiving, from the user device, the user device interaction authorization result,
wherein the public key is a secret encipherment public key, and wherein the user device certificate includes the secret encipherment public key and a user device public key.

11. The contactless access device of claim 10, wherein the operations further comprises:
receiving an authorizing entity certificate comprising an authorizing entity public key from the user device, wherein the authorizing entity certificate is signed by a certificate authority private key;
verifying the authorizing entity certificate using a certificate authority public key available to the contactless access device and corresponds to the certificate authority private key; and
if the authorizing entity certificate is valid, obtaining the authorizing entity public key from the authorizing entity certificate.

12. The contactless access device of claim 11, wherein the user device certificate is signed by an authorizing entity private key corresponding to the authorizing entity public key, and wherein verifying the user device certificate further comprises:
verifying the user device certificate using the authorizing entity public key; and
if the user device certificate is valid, obtaining the user device public key from the user device certificate.

13. The contactless access device of claim 10, wherein the operations further comprise:
generating a challenge command message that requests the unpredictable number from the user device;
providing the challenge command message to the user device, wherein the user device obtains the unpredictable number and provides the unpredictable number to the contactless access device; and
receiving the unpredictable number from the user device.

14. A contactless access device comprising:
a processor; and
a computer-readable medium coupled to the processor, the computer-readable medium comprising code executable by the processor for implementing operations comprising:
determining an interaction value associated with an interaction;
responsive to determining the interaction value, prompting a user operating a user device for a secret;
receiving the secret from the user;
after receiving the secret from the user, receiving, from the user device, an initial communication from the user device over a wireless communication medium;

receiving, from the user device, a user device certificate comprising a public key;

verifying the user device certificate;

concatenating the secret, the unpredictable number, and a padding value to form the concatenated value, wherein the padding value increases a length of the concatenated value to be equal to an encryption data length specified by the public key;

encrypting the concatenated value with the public key;

transmitting the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and receiving, from the user device, the user device interaction authorization result.

15. The contactless access device of claim 14, wherein the contactless access device is a POS (point of sale) terminal.

16. A contactless access device comprising:

a processor; and a computer-readable medium coupled to the processor, the computer-readable medium comprising code executable by the processor for implementing a method operations comprising:

determining an interaction value associated with an interaction;

responsive to determining the interaction value, prompting a user operating a user device for a secret;

receiving the secret from the user;

after receiving the secret from the user, receiving, from the user device, an initial communication from the user device over a wireless communication medium;

receiving, from the user device, a user device certificate comprising a public key;

verifying the user device certificate;

concatenating at least the secret and an unpredictable number to form a concatenated value;

encrypting the concatenated value with the public key;

transmitting the encrypted concatenated value over the wireless communication medium to the user device, wherein the user device decrypts the encrypted concatenated value with a private key corresponding to the public key, verifies the unpredictable number, verifies the secret by comparing the secret to another secret stored in the user device, determines whether or not the interaction is approved based at least upon the verification of the secret, produces a user device interaction authorization result, and then provides the user device interaction authorization result to the contactless access device; and receiving, from the user device, the user device interaction authorization result, wherein the operations further comprise:

generating an authorization request message comprising at least the interaction value and interaction data associated with the interaction; and providing the authorization request message to a resource provider computer, wherein the resource provider computer provides the authorization request message to a transport computer that provides the authorization request message to a network processing computer, wherein the network processing computer provides the authorization request message to an authorizing entity computer for authorization of the interaction.

17. The contactless access device of claim 16, wherein the operations further comprise:

receiving an authorization response message from the authorizing entity computer, via the network processing computer, the transport computer, and the resource provider computer, wherein the authorization response message is created by the authorizing entity computer and includes an indication of whether or not the interaction is authorized.

18. A method comprising:

upon entering communication range with a contactless access device during an interaction, providing, by a user device, an initial communication from the user device over a wireless communication medium;

receiving, by the user device, a read record command from the contactless access device, wherein the read record command requests at least one or more certificates from the user device;

obtaining, by the user device, at least the one or more certificates from memory;

generating, by the user device, a read record response message comprising at least the one or more certificates;

providing, by the user device, the read record response message to the contactless access device in response to the read record command, wherein the one or more certificates includes a user device certificate comprising a public key, wherein the contactless access device verifies the user device certificate, concatenates at least a secret provided by a user of the user device to the contactless access device and an unpredictable number to form a concatenated value, encrypts the concatenated value with the public key, and transmits the encrypted concatenated value over the wireless communication medium to the user device;

receiving, by the user device, the encrypted concatenated value from the contactless access device;

decrypting, by the user device, the encrypted concatenated value using a private key corresponding to the public key;

verifying, by the user device, the secret included in the concatenated value by comparing the secret to another secret stored in the user device;

producing, by the user device, a user device interaction authorization result based on whether or not the interaction is approved based at least upon the verification of the secret; and providing, by the user device, the user device interaction authorization result to the contactless access device, wherein after providing the user device interaction authorization result to the contactless access device, the contactless access device generates an authorization request message comprising at least an interaction value and interaction data associated with the interaction and provides the authorization request message to a resource provider computer, wherein the resource provider computer provides the authorization request message to a transport computer that provides the authorization request message to a network processing computer, wherein the network processing computer provides the authorization request message to an authorizing entity computer for authorization of the interaction.

19. The method of claim 18 further comprising:

receiving, by the user device, a challenge command message from the contactless access device that requests the unpredictable number;

obtaining, by the user device, the unpredictable number; and providing, by the user device, the unpredictable number to the contactless access device.

20. The method of claim 18, wherein the interaction is a payment transaction.

* * * * *